Figure 1:
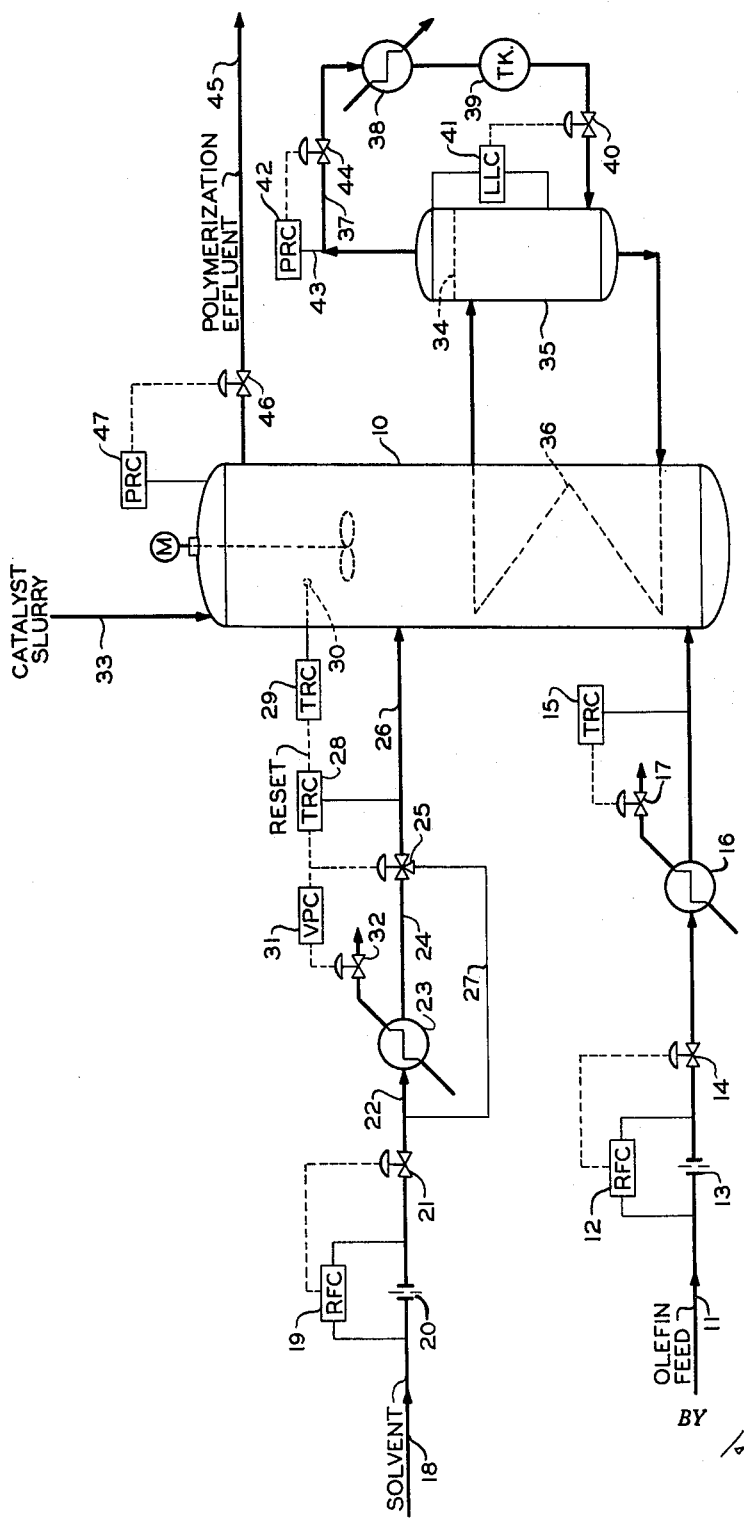

March 9, 1965 D. E. LUPFER 3,172,880
TEMPERATURE CONTROL FOR CHEMICAL REACTION VESSELS
Filed Sept. 16, 1960 3 Sheets-Sheet 1

INVENTOR.
D. E. LUPFER
BY Hudson & Young
ATTORNEYS

March 9, 1965     D. E. LUPFER     3,172,880
TEMPERATURE CONTROL FOR CHEMICAL REACTION VESSELS
Filed Sept. 16, 1960     3 Sheets-Sheet 2

INVENTOR.
D. E. LUPFER
BY
*Hudson & Young*
ATTORNEYS

March 9, 1965  D. E. LUPFER  3,172,880
TEMPERATURE CONTROL FOR CHEMICAL REACTION VESSELS
Filed Sept. 16, 1960  3 Sheets—Sheet 3

INVENTOR.
D. E. LUPFER
BY Hudson & Young
ATTORNEYS

United States Patent Office 3,172,880
Patented Mar. 9, 1965

3,172,880
TEMPERATURE CONTROL FOR CHEMICAL
REACTION VESSELS
Dale E. Lupfer, Bartlesville, Okla., assignor to Phillips
Petroleum Company, a corporation of Delaware
Filed Sept. 16, 1960, Ser. No. 56,573
9 Claims. (Cl. 260—93.7)

This invention relates to a process and apparatus for controlling the temperature of fluid streams. In accordance with one aspect, this invention relates to temperature control of chemical reactions. In accordance with another aspect, this invention relates to the temperaure control of exothermic polymerization reactions. In accordance with still another aspect, this invention relates to the control of the polymerization of olefins in the presence of a solvent and a catalyst at a substantially constant temperature. In accordance with another aspect, this invention relates to an improved control system responsive to measured temperatures wherein temperature corrections are obtained rapidly and substantially immediately upon detection of a temperature change.

In the prior art, common attempts to control chemical reactions, such as polymerization of olefins, have proved difficult as there is a definite tendency for such reactions to accelerate and overheat, or decelerate and cool off, as higher temperatures accelerate the reaction and lower temperatures decelerate it. However, in order to maintain the quality of the product and the "rate of yield" constant, it is essential that the temperature of the reaction be maintained substantially constant. Also, since even very minor fluctuations in temperature in the polymerization reaction materially alter the polymer product obtained, it is highly desirable and often necessary to have a control system that makes immediate corrections responsive to detected changes. The present invention is particularly directed to an improved control system having almost immediate response to detected changes in temperature particularly adapted for controlling the temperature of a feed stream passed to a polymerization reaction at a predetermined temperature level.

Accordingly, an object of this invention is to provide improved processes for controlling the temperature of chemical reactions and improved systems for carrying out said processes.

Another object of this invention is to provide a process and system for controlling the temperature of an exothermic polymerization reaction.

Another object of this invention is to provide an improved control system that regulates the temperature of a fluid stream responsive to a measured temperature with almost immediate response.

A further object of this invention is to provide a process and system for controlling the temperature and polymerizaiton of ethylene in a liquid hydrocarbon solvent in which the reaction is exothermic.

Other objects, aspects as well as the several advantages will be apparent to those skilled in the art upon reading the accompanying drawing, specification and the appended claims.

The present invention may be regarded as an improvement over U.S. patent application Serial No. 717,679 of Neil C. Miller, filed February 26 1958, now abandoned, and U.S. patent application Serial No. 858,763 of Parkin T. Snowden, Jr., filed December 12, 1959, now abandoned.

In accordance with one specific concept of the invention, I provide an improved process for controlling the temperature of a fluid stream at a predetermined temperature level, for example, a feed stream passed to a chemical reaction, such as a polymerization reaction, which comprises mixing a cold portion of said fluid with a warmer portion of said fluid to form a mixed stream, measuring the temperature of the mixed stream, and regulating the amount of warmer and colder fluids mixed responsive to changes of a measured temperature so as to maintain the desired predetermined temperature, and automatically adjusting the temperature of one of the streams to be mixed responsive to the ratio of colder and warmer streams mixed so as to maintain the amount of warmer and cold fluids mixed at the original ratio, thereby maintaining the desired predetermined temperature.

In a specific application of the above concept, the temperature of a feed stream, for example, diluent or solvent, passed to an olefin polymerization reaction is controlled responsive to the measured temperature of a blended stream by controlling the amount of cold solvent, for example, by-passed around a feed preheater. The cold and warm streams are preferably mixed in a 3-way valve controlled by a temperature controller. The amount of heat exchanged with the feed in the preheater is controlled by a valve positioning controller responsive to the ratio of hot and cold streams being mixed or position of the 3-way valve. Upon a detected change in the temperature of the mixed stream, or in the reactor, the 3-way valve is immediately adjusted to correct the deficiency, and then the amount of heat exchanged with the feed in the preheater is subsequently adjusted responsive to the position of the 3-way valve.

As discussed above, the 3-way valve mixes streams of hot and cold solvent or diluent, for example, in such proportions as to produce a blend with the desired predetermined temperature. It has been found that this control method by itself is not enough since the 3-way valve will sooner or later swing to one extreme position or the other and thereafter permit no control unless, however, large reserves of both hot and cold solvent are made available, which is not economically feasible. In order to return the 3-way valve to its mid position following a change and thus place it in readiness for a quick change in either direction, the present invention manipulates or regulates the flow of steam condensate, for example, from the relatively slow responding preheater and forces a total correction to be made by changing the temperature of the hot solvent stream. This is accomplished by inserting a valve positioning controller between the temperature controller and the steam condensate motor valve.

The single figure of the drawing is an elevational view of a polymerization reactor embodying the invention. While this figure shows the invention applied to the polymerization of an olefin feed in a solvent with the aid of a catalyst, it is believed obvious that the present invention also applies generically to all types of endothermic or exothermic chemical reactions. Furthermore, the present invention is applicable to any heat exchange system wherein a cold stream is blended with a warmer stream in amounts responsive to a measured temperature of the blended stream, and simultaneously adjusting the temperature of one of the streams responsive to the ratio of the colder and warmer streams being mixed so as to maintain the original ratio of materials mixed. Thus, the blended stream could be a heat exchange fluid passed to reaction zone, either endothermic or exothermic, a diluent such as described later herein, or any other stream where it is desired to maintain a predetermined temperature level and wherein it is desired, or necessary, to obtain a quick or immediate correction of the temperature responsive to the measured temperature of the mixed streams.

Although the invention is not limited to liquid-phase reaction, an advantageous application thereof is to liquid-phase operation which is a frequently preferred mode of conducting polymerization. When polymerization is conducted in the liquid phase, it is often preferred to utilize a catalyst in the form of a slurry or suspension in an inert solvent or diluent. The invention is not limited to a particular catalyst or diluent and any catalyst known for the polymerization of olefins to normally solid polymers can be advantageously employed in the process. Also, it should be understood that the invention is not limited to any particular diluent or solvent for use in the process and the choice of diluent will depend primarily upon the particular catalyst employed or the type of polymer to be produced.

A particularly advantageous polymerization catalyst and diluent that can be employed in the process of my invention are described in U.S. patent 2,825,721 of Hogan et al. According to said patent, a chromium oxide catalyst, preferably containing hexavalent chromium, is employed to prepare normally solid polymers of 1-olefins. Diluents or solvents that can be used in that process are hydrocarbon solvents which are inert and liquid under the polymerization conditions, such as paraffins and naphthenes having from 5 to 12 carbon atoms per molecule. Commonly known polymerization catalysts such as the Ziegler-type and the high pressure type polymerization catalysts as well as other diluents or solvents can also be used, if desired, in my process.

While the polymerization of ethylene provides a preferred embodiment of the invention, it is not intended that the scope of the invention be limited thereby and many modifications are also within the scope of the invention.

Referring now to the drawing, a polymerization reactor 10 is supplied with an olefin feed, for example ethylene, through conduit 11. It is preferred to supply said olefin at substantially a constant rate and temperature. Said rate is preferably controlled by a rate of flow controller 12 actuated by the pressure drop across a diaphragm orifice 13, which controller controls said flow rate by varying the opening of valve 14. Said temperature is preferably controlled by a temperature recording controller 15 which senses the temperature downstream of heat exchanger 16 in conduit 11 and varies the rate of flow of heating or cooling medium through valve 17.

Reactor 10 is also supplied with a suitable solvent or diluent for said olefin feed through conduit 18. The solvent or diluent can also be a solvent for the polymer produced from said olefin. It is preferred to supply said solvent at a substantially constant rate and temperature. Said rate is preferably controlled by a rate of flow controller 19, orifice 20 and valve 21, operating the same as previously described corresponding parts 12, 13 and 14, respectively.

The temperature of the solvent is preferably controlled in accordance with the invention by passing a portion of the solvent stream through conduit 22, preheater 23, conduit 24, mixing valve 25, and then through conduit 26 into reactor 10. The temperature controlled solvent stream in conduit 26 can be, if desired, passed through a jacket surrounding the reactor, through coils within the reactor, as well as being introduced directly into the reactor. The remaining portion of the solvent or diluent is bypassed around preheater 23 through conduit 27 and enters mixing valve 25 wherein it is blended with preheated solvent. Mixing valve 25 is a 3-way valve, as shown in the drawing.

Temperature controller 28 (two mode controller-proportion plus integral) senses the temperature of the mixed solvent stream in conduit 26 downstream from mixing valve 25 and varies the amount of heated and cold or unheated solvent mixed in mixing valve 25. Thus, in accordance with the present invention, solvent temperature is manipulated with almost immediate response by adjusting 3-way valve 25. The 3-way valve 25 mixes streams of hot and cold solvent in conduits 24 and 27, respectively, in such proportions as to produce a blend with the desired predetermined temperature. Temperature controller 28 is reset by temperature controller 29 (two mode controller-proportion plus integral) so as to maintain the temperature in reactor 10 constantly at a predetermined desired temperature adjacent temperature sensing means 30 connected to controller 29.

I have found that the above-described control system for solvent addition by itself is not enough for best operation since the 3-way valve will sooner or later swing to one extreme position or the other and thereafter permit no control. A valve positioning controller 31 (two mode controller-proportion plus integral) is connected to temperature controller 28 and control valve 32, in the steam condensate line for preheater 23, to return the 3-way valve to its mid position following a change, and thus place it in readiness for a quick change in either direction.

In actual operation, a 9 p.s.i.g. set-point pressure is applied to controller 31 and temperature controller 28 also puts out a 9 p.s.i.g. signal during lined out operation (3-way valve in mid position) and controller 31 takes no action. When temperature controller 29 calls for a different solvent temperature, temperature controller 28 sends out a signal of say 7 p.s.i.g. This adjusts the 3-way valve slightly and the required solvent temperature is quickly obtained. TRC 28 must maintain the new 7 p.s.i.g. output signal to hold the new solvent temperature. Controller 31 now issues an output signal of 7 p.s.i.g. which changes the setting of the steam condensate valve 32. This continues until the effect of the temperature change of the hot solvent stream is sensed by TRC 28. TRC 28 then slowly returns its output signal to 9 p.s.i.g. with corresponding return of the 3-way valve to its mid-position. Steam condensate valve 32 holds its new position and thus has made the total correction. Maintaining the 3-way valve in its mid position insures equal flow of the hot and cold streams of solvent to the reactor.

When the polymerization reaction requires a catalyst it can be added to the reactor through conduit 33. When added, it is preferred to add the catalyst at a constant rate, and if the catalyst is a solid in the form of a mud or slurry, preferably in the same solvent as is being supplied through conduit 18, or the same reactant as supplied through conduit 11.

The polymerization of olefins, with or without a catalyst, is an exothermic reaction. The excess heat produced is removed from reactor 10 at a substantially constant rate by liquid coolant 34 supplied from tank 35 by thermo-siphon action through cooling coil 36 running through reactor 10 in the direction indicated by the arrows. While the drawing shows the coolant passing through a coil in the reactor, it should be understood that the coolant can be supplied to a jacket on the reactor wall, or both cooling means can be used. Coolant liquid 34 is preferably selected so that the transfer of heat to coil 36 causes evaporation of said liquid in coil 36 into vapor, which vapor expands into tank 35 from which it is removed by conduit 37, and is condensed to a liquid in heat exchanger 38 by indirect heat exchange with a second coolant such as water. Liquid coolant 34 can be stored in tank 39 and is then returned, as needed, to tank 35 through valve 40 controlled by conventional liquid level control 41.

The rate of heat removal from reactor 10 by coolant 34 is maintained substantially constant by pressure recorder controller 42 sensing the vapor pressure in tank 35 through conduits 37 and 43 and maintaining said pressure constant by varying the opening of valve 44.

The polymerization effluent is removed from tank or reactor 10 through conduit 45 preferably controlled by valve 46, which is in turn controlled by pressure recorder controller 47 set to maintain a substantially constant pressure in reactor 10. In cases where the vapor pressure of the reactant in reaction zone 10 is substantially atmospheric, valve 46 and controller 47 can be omitted and still practice the invention.

By maintaining the pressure over liquid 34 at a predetermined constant pressure by means of pressure recorder controller 42 and by varying only the heating of at least a portion of the feed through lines 11 and 18 in response to the actual temperature of the reaction as picked up by temperature sensing means 30 adjacent said reaction, a much faster and steadier control is obtained without any tendency to "hunt" or oscillate by overcontrolling, which has been a difficulty of the prior art. As a result, the temperature in reactor 10 is maintained within a narrower range of temperature variation than is possible in the prior art. Furthermore, the subject invention manipulates solvent temperature in order to control reactor temperature with almost immediate response by adjusting a 3-way valve which is then subsequently returned to its mid position by adjusting the preheater heat responsive to the position of the 3-way valve.

Figure 2:
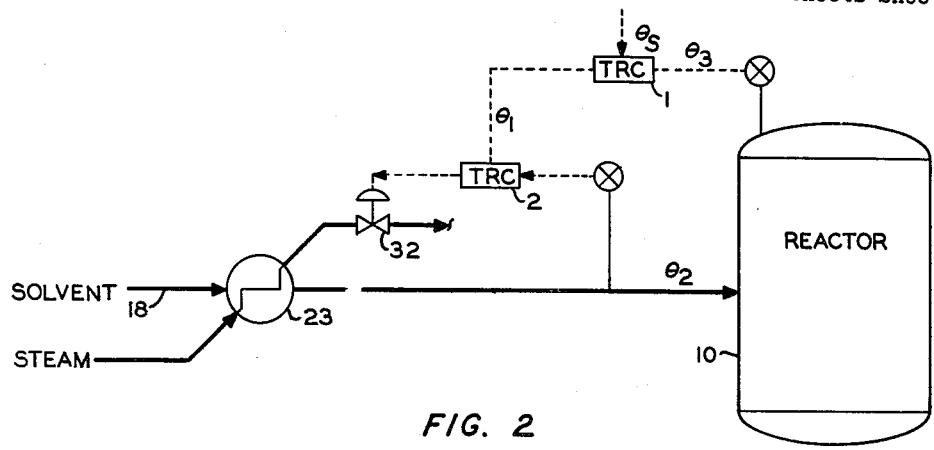

Conventional temperature control of the above-described polymerization reactor is accomplished in the manner shown in FIGURE 2. A simplified analysis of the reactor temperature control can be made in the following manner. The system is first put in block diagram form, for which the following simplified assumptions are made: TRC-2 control loop has a first order response with a time constant of 5 minutes, that is $$\frac{\theta_2}{\theta_1}(s) = \frac{1}{5S+1}$$

$S$ = Laplace operator
$(s)$ = signifies Laplace domain

The reactor has first order response with time constant of 100 minutes, that is $$\frac{\theta_3}{\theta_2}(s) = \frac{1}{100S+1}$$

TRC-1 has proportional control only for this example:

$$\frac{\theta_1}{\theta_3}(s) = K$$

Figure 3:
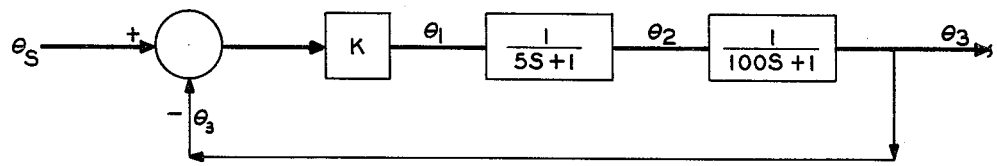

From FIGURE 3, which illustrates a simplified block diagram of the temperature control system of FIGURE 2, the closed loop transfer function can be determined as follows:

$$\frac{\theta_3}{\theta_5}(s) = \frac{\frac{K}{(5S+1)(100S+1)}}{1 + \frac{K}{(5S+1)(100S+1)}}$$

which reduces to $$\frac{\theta_3}{\theta_5}(s) = \frac{K}{500S^2 + 105S + (K+1)}$$

From this transfer function one can determine what response the system will have to setpoint changes for various values of K. One can also determine what value of K will produce critical damping. The value of K which will give critical damping is first determined by solving for the roots of the denominator.

$$S = \frac{-105 \pm \sqrt{(105)^2 - 4(500)(K+1)}}{2(500)}$$

The system will be critically damped when the two quantities under the square root radical are equal.

$$(105)^2 = 4(500)(K+1)$$

$$K = \frac{11025}{2000} - 1 = 4.5125$$

If the controller gain is adjusted to this value (4.5125), the reactor temperature will have a critically damped response to a setpoint step change. The time constant of this response will be equal to the reciprocal of the S value, or $$T = \frac{2(500)}{105} = 9.524 \text{ min.}$$

Figure 4:
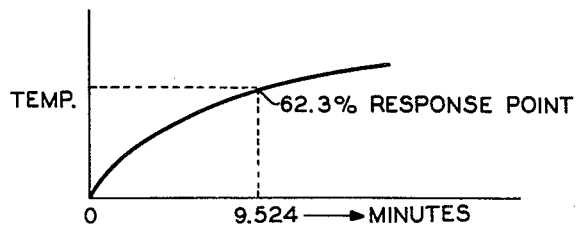

FIGURE 4 illustrates the response of reaction temperature to setpoint step change when proportional controller is tuned for critical damping.

Figure 5:
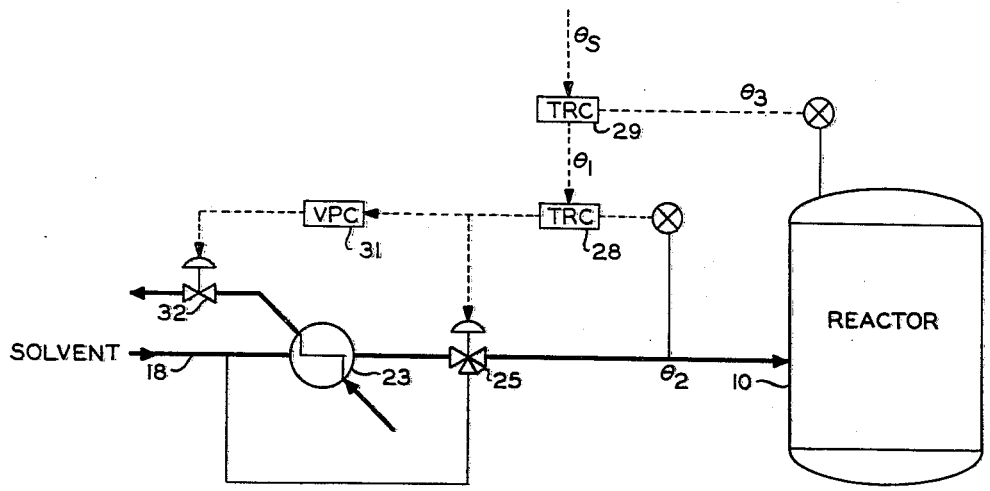

The above-described reactor temperature control system is redesigned in accordance with the invention to eliminate the five-minute time constant as shown in FIGURE 5.

Figure 6:
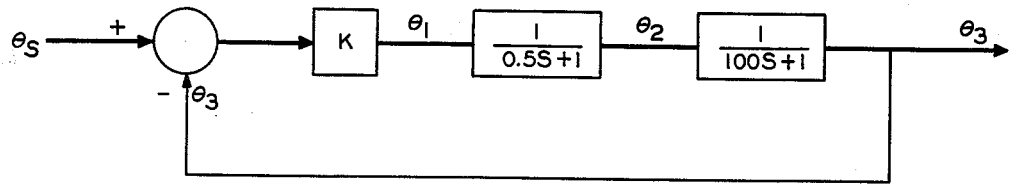

In this system $\theta_2$ will respond much faster to a change in $\theta_1$ than in the conventional arrangement described above. Assuming that the relationship between $\theta_2$ and $\theta_1$ is a first order lag with a ½ minute time constant, the block diagram will be as illustrated in FIGURE 6.

The closed loop transfer function for this will be $$\frac{\theta_3}{\theta_5} = \frac{K}{50S^2 + 100.5S + (K+1)}$$

K for critical damping will be:

$$S = \frac{-100.5 \pm \sqrt{(100.5)^2 - 4(50)(K+1)}}{2(50)}$$

$$4(50)(K+1) = (100.5)^2$$

$$K = \frac{10100}{200} - 1 = 50.5$$

The system response time constant will be:

$$T = \frac{2(50)}{100.5} = 1 \text{ min.}$$

It can be seen that the modified system response in accordance with the invention is about ten times faster than the conventional system.

The following example is included to illustrate one aspect of the invention:

Example

In a reactor of the type illustrated in the drawing, ethylene is polymerized by the method of Hogan et al., supra, in the presence of cyclohexane and chromium oxide catalyst supported on silica-alumina containing approximately 2.5 percent chromium of which approximately 2 weight percent is hexavalent chromium. The reaction is carried out at a temperature of 275° F. and a pressure of approximately 400 p.s.i. The operating conditions are as follows:

| Feed (Stream) | Normal | After Decreased Catalyst Activity |
|---|---|---|
| Ethylene (11), lbs./hr | 1,200 | 1,200 |
| Cyclohexane (18), lbs./hr | 9,200 | 9,200 |
| Catalyst (33), lbs./hr | 1.0 | 1.0 |

| | Lbs. polymer | Lbs. polymer |
|---|---|---|
| Catalyst Activity, lb. catalyst | 800 | 700 |

| Operating Conditions | Normal | After Decreased Catalyst Activity |
|---|---|---|
| Reactor Temperature (30) ° F | 275 | 275 |
| Reactor Pressure, p.s.i | 400 | 400 |
| Coolant (Tank) Temperature (34), ° F | 240 | 240 |
| Cyclohexane Input Temperature (28), ° F | 165 | 175 |
| Polyethylene Production Rate, lbs./hr | 800 | 700 |
| Polymerization Effluent (45) lbs./hr | 10,000 | 10,000 |
| Heat of Reaction Removed by Indirect Heat Transfer (36), B.t.u./hr | 576,000 | 576,000 |
| Heat of Reaction Lost to Incoming Cyclohexane (26), B.t.u./hr | 576,000 | 432,000 |

When the catalyst activity decreased from 800 lbs. polyethylene/lb. of catalyst to 700 lbs. polyethylene/lb. catalyst, as shown above, polyethylene production was decreased to a rate of 700 lbs. polyethylene per hour which in turn caused a reduction in the heat of reaction evolved.

Since a constant amount of heat is removed by indirect heat transfer (36), the reactor temperature (30) briefly dropped to 274.5° F., thus causing TRC 28 to be reset by TRC 29 from 165° F. to 175° F., thereby returning the reactor temperature to 275° F. by passing warmer cyclohexane to the reactor. TRC 28 sends out a signal to by-pass valve 25 to adjust same so as to pass more heated solvent and less cold solvent therethrough. The increased temperature of blended solvent in line 26 is obtained almost instantaneously and the reactor temperature returned to 275° F. in less than 5 minutes. In a conventional temperature control system approximately one hour is required to return the reactor temperature to its desired value following a change in said reactor temperature.

VPC 31 now sends out a signal which changes the setting of valve 32 so as to allow more steam to pass through preheater 23. The steam condensate valve 32 is held at this new position until TRC 28 senses the effect of the warmer solvent in hot stream 24. TRC 28 now slowly returns valve 25 to its mid-position. Valve 32 holds its new position and thus has made the total correction. Valve 25, now being at its mid-position again, is ready for another quick change in either direction responsive to reactor temperature. Upon an increase in temperature in the reactor, for example, TRC 29 will reset TRC 28 to a lower solvent temperature.

While the invention has been described with relation to several specific embodiments, especially the ones shown in the drawing, it is believed the invention is not limited thereto but is applicable to the control of any exothermic or endothermic chemical reaction as well as the control of any fluid stream formed by mixing a cold with a warmer stream responsive to the blended stream temperature. An endothermic reaction in which my invention can be used is the hydrogenation of vegetable oils in the presence of a nickel catalyst. A heating medium, for example, water, or other suitable fluid material, the temperature of which is controlled as set forth above, can be passed through coils in the reactor or through a jacket surrounding the reactor.

It will be apparent to those skilled in the art that various modifications of the invention can be made upon study of the accompanying disclosure. Such modifications are believed to be clearly within the spirit and scope of the invention.

I claim:

1. A process for controlling at a predetermined temperature level the temperature of a fluid stream passed to an exothermic chemical reaction wherein the heat of reaction is continuously removed from said zone, said level being automatically reset responsive to measured temperature changes in said reaction, which comprises continuously mixing a cold portion of said fluid with a heated portion of said fluid at a predetermined ratio to form said stream, continuously measuring the temperature of said stream and regulating the amount of heated and cold fluids mixed responsive to changes in the measured temperature so as to maintain said stream at said predetermined temperature level, and automatically adjusting the temperature of the heated stream responsive to a new ratio of said cold and heated portions being mixed so as to readjust the amount of heated and cold fluids mixed to the original ratio and thereby maintain said predetermined desired temperature.

2. In a process for the polymerization of olefins to normally solid polymers in which olefins are polymerized in a zone in the presence of a diluent introduced at a predetermined elevated temperature and wherein excess heat of reaction is removed by passing a coolant material in indirect heat exchange with the contents of said zone, the improvement comprising continuously mixing a cold stream of said diluent with a heated stream of said diluent at a predetermined ratio and introducing the mixed stream into said polymerization, continuously measuring the temperature of said mixed stream and automatically regulating the amount of said cold stream mixed with said heated stream so as to maintain said mixed stream at said predetermined temperature level, and automatically adjusting the temperature of said heated stream responsive to a new ratio of said cold and heated diluent streams being mixed so as to readjust the amount of cold and heated streams mixed to the original ratio, thereby maintaining the temperature of said mixed stream at said predetermined temperature.

3. A process according to claim 2 wherein said predetermined temperature level is automatically reset responsive to measured changes in the temperature of said polymerization.

4. A temperature control system comprising, in combination, a warm stream of fluid, a cold stream of fluid, three-way valve means connected to said warm and cold streams for mixing said warm and cold streams to form a blended stream whose temperature is to be controlled, said blended stream being passed to a vessel, means for detecting the temperature of said blended stream, said detecting means being adapted to control the amount of warm and cold fluids mixed in said mixing means by adjusting the position of said valve means responsive to changes in the detected temperature so as to maintain said blended stream at a predetermined temperature level, means connected to said vessel and said detecting means added to reset said detecting means responsive to temperature changes in said vessel and means operably connected to said temperature detecting means adapted to adjust the temperature of said warm stream to be mixed responsive to the position of said valve mixing means, thereby returning said valve mixing means to its original position so as to maintain the original ratio of warm and cold fluids mixed therein.

5. A temperature control system for automatically controlling the temperature of a feed stream passed to a reactor at a predetermined temperature level which comprises, in combination, a reactor, means to convey said feed stream to said reactor, a hot stream of said feed, a cold stream of said feed, three-way valve means connected to said hot and cold stream and said feed stream for mixing said hot and cold streams to form said feed stream whose temperature is to be controlled, means for detecting the temperature of said feed stream, said temperature detecting means being adapted to control the amount of hot and cold streams mixed in said valve mixing means responsive to temperature changes detected in said blended stream so as to maintain said feed stream at said predetermined temperature, temperature controller means connected to said reactor adapted to reset said predetermined temperature responsive to temperature changes in said reactor, and controller means operably connected to the position of said valve mixing means adapted to automatically adjust means for supplying heat to said hot stream responsive to changes in said detected temperature, thereby returning said valve mixing means to its original position so as to maintain the original ratio of hot and cold fluids mixed therein and thus place the valve in readiness for another change in either direction.

6. The combination of claim 5 in which the means to heat said hot stream comprises an indirect heat exchanger with a supply of heating fluid controlled by said controller means and a first temperature controller responsive to the temperature of said mixed feed stream downstream from said heat exchanger and said valve mixing means, said temperature controller means comprises a second temperature controller connected to reset said first temperature controller.

7. In an apparatus which comprises, in combination, a reactor, means for introducing reactant, catalyst and diluent to said reactor, conduit means for withdrawing reaction effluent from said reactor, heat exchange means adapted for the passage of a fluid coolant therethrough disposed in said reactor, the improvement which comprises heat exchanger means disposed in the conduit means for introducing diluent to the reactor, a 3-way mixing valve downstream from said heat exchanger in said diluent conduit, a diluent bypass conduit connected to said diluent conduit upstream of said heat exchanger and to one inlet of said 3-way valve, temperature controller means for controlling the position of said 3-way valve responsive to the temperature in said reactor, and valve position controller means connected to said 3-way valve adapted to control the flow of heating fluid through said heat exchanger responsive to the position of said valve, thereby returning said mixing valve to its original position so as to maintain the original ratio of heated diluent and bypass diluent mixed therein and place the valve in readiness for another change in either direction.

8. Apparatus according to claim 7 wherein said temperature controller means comprises a first temperature controller adapted to control said valve means and valve positioning means responsive to the temperature of diluent downstream from said mixing valve, a second temperature controller for resetting the control index of said first temperature controller in accordance with the reactor temperature to maintain the temperature of said diluent constant at a predetermined temperature, and a flow controller in said diluent conduit upstream of said by-pass conduit set to maintain a constant flow of diluent through said heat exchange means and said by-pass conduit.

9. A process for controlling at a predetermined temperature level the temperature of a fluid stream passed to an endothermic chemical reaction where the heat of reaction is continuously applied to said zone, said level being automatically reset responsive to measured temperature changes in said reaction, which comprises continuously mixing a cold portion of said fluid with a heated portion of said fluid at a predetermined ratio to form said stream, continuously measuring the temperature of said stream and regulating the amount of heated and cold fluids mixed responsive to changes in the measured temperature so as to maintain said stream at said predetermined temperature level, and automatically adjusting the temperature of the heated stream responsive to a new ratio of said cold and heated portions being mixed so as to readjust the amount of heated and cold fluids mixed to the original ratio and thereby maintain said predetermined desired temperature.

References Cited in the file of this patent
UNITED STATES PATENTS

| | | |
|---|---|---|
| 2,440,822 | Hachmuth | May 4, 1948 |
| 2,788,264 | Bremer et al. | Apr. 9, 1957 |
| 2,908,734 | Cottle | Oct. 13, 1959 |